United States Patent [19]

Spencer

[11] Patent Number: 5,296,525
[45] Date of Patent: Mar. 22, 1994

[54] AQUEOUS COATING COMPOSITIONS

[75] Inventor: Arthur T. Spencer, Allison Park, Pa.

[73] Assignee: The Valspar Corporation, Minneapolis, Minn.

[21] Appl. No.: 965,605

[22] Filed: Oct. 22, 1992

Related U.S. Application Data

[63] Continuation of Ser. No. 840,620, Feb. 20, 1992, abandoned, which is a continuation of Ser. No. 741,217, Aug. 2, 1991, abandoned, which is a continuation of Ser. No. 636,547, Jan. 4, 1991, abandoned, which is a continuation of Ser. No. 567,683, Aug. 14, 1990, abandoned, which is a continuation of Ser. No. 471,017, Jan. 22, 1990, abandoned, which is a continuation of Ser. No. 84,915, Aug. 13, 1987, abandoned.

[51] Int. Cl.$^5$ .................... C08K 3/20; C08L 25/04
[52] U.S. Cl. .................... 523/408; 523/407; 523/411; 525/187; 525/530
[58] Field of Search ............ 525/530, 187; 523/407, 523/408, 411

[56] References Cited

U.S. PATENT DOCUMENTS

| | | | |
|---|---|---|---|
| 4,212,776 | 7/1980 | Martinez et al. | 260/18 |
| 4,212,781 | 7/1980 | Evans et al. | 260/29.4 |
| 4,247,439 | 1/1981 | Matthews et al. | 260/29.6 |
| 4,285,847 | 8/1981 | Ting | 260/29.2 |
| 4,294,737 | 10/1981 | Sekmakas et al. | 260/29.2 |
| 4,308,185 | 12/1981 | Evans et al. | 428/418 |
| 4,335,028 | 6/1982 | Ting et al. | 524/504 |
| 4,399,241 | 8/1983 | Ting et al. | 523/400 |
| 4,443,568 | 4/1984 | Woo | 523/406 |
| 4,444,923 | 4/1984 | McCarty | 523/407 |
| 4,446,258 | 5/1984 | Chu et al. | 523/406 |
| 4,482,671 | 11/1984 | Woo et al. | 525/31 |
| 4,595,716 | 6/1986 | Woo et al. | 523/403 |

Primary Examiner—Melvyn I. Marquis
Assistant Examiner—D. Aylward
Attorney, Agent, or Firm—Fredrikson & Byron

[57] ABSTRACT

A coating composition particularly adapted for can coatings is prepared by the addition polymerization of a monomer such as styrene in a reaction medium comprising a modified 1,2 epoxy resin. The epoxy resin is modified by combining a portion of its 1,2-epoxy groups with epoxy-reactive groups of an ethylenically unsaturated monomer, and reacting others of its 1;2-epoxy groups with a tertiary amine and with a preformed addition polymer containing carboxyl groups to form an ionic, resinous composition containing sufficient carboxyl groups to render the coating composition self-dispersible in water in neutralized form.

12 Claims, No Drawings

AQUEOUS COATING COMPOSITIONS

This application is a continuation of U.S. Ser. No. 840,620 filed Feb. 20, 1992, now abandoned, which is a continuation of Ser. No. 741,217 filed Aug. 2, 1991, ABN, which is a continuation of Ser. No. 636,547 filed Jan. 4, 1991, ABN, which is a continuation of Ser. No. 567,683 filed Aug. 14, 1990, ABN, which is a continuation of Ser. No. 471,017 filed Jan. 22, 1990, ABN, which is a continuation of Ser. No. 84,915 filed Aug. 13, 1987, ABN.

BACKGROUND OF THE INVENTION

This invention relates to coating compositions based on aqueous dispersions of epoxy resin-derived polymers, the compositions having particular utility in the formation of protective coatings for food and beverage containers and other metal substrates.

A variety of coating compositions have been formulated particularly for use as internal coatings for beverage containers and especially for beer cans. Such coatings must be continuous (that is, pin hole free) to prevent contact of beverages with metal container surfaces, must be inert to attack from the beverage ingredients even at elevated storage temperatures, must not contribute to (or subtract from) the beverage flavor, and must be capable of withstanding sharp bends and impacts as beverage cans are dropped, dented or otherwise deformed during handling. Although polymeric coatings may be formed as solutions in organic solvents, it is generally preferred to avoid as much as possible the use of organic solvents which are costly and environmentally undesirable and to employ either 100% solids coating materials or coatings comprisinq polymeric species that are dispersed, as latexes, in aqueous media. Coating compositions based upon epoxy resins have been particularly valuable inasmuch as such compositions provide coatings characterized by excellent impact resistance, barrier properties and resistance to beverage ingredients. Epoxy resins, however, are relatively expensive; as a result, attempts have been made to add somewhat less expensive polymeric components, such as styrene and (meth)acrylate addition polymers. Examples of coating compositions of this type are found in U.S. Pat. Nos. 4,285,847 (Ting) and 4,446,258 (Chu and Spencer).

U.S. Pat. No. 4,285,847 refers to an epoxy acrylic polymeric surfactant made by free radical grafting of ionizable acrylic side chains to an epoxy backbone at points of hydrogen abstraction followed by neutralization and dispersion in water. A second polymer is emulsion polymerized in situ in the epoxy acrylic surfactant dispersion to form a separate polymer phase. Cost reduction is obtained from the less expensive second polymer which permits the use of less of the expensive epoxy component without compromising required film properties.

In U.S. Pat. No. 4,446,258, a different type of epoxy acrylic polymeric surfactant is made by esterifyinq an epoxy resin with a preformed ionizable acrylic polymer and then dispersinq the composition in an aqueous vehicle. A second, low cost polymer is then polymerized in situ. Additional benefits are obtained in this procedure in the latitude of solids and viscosity that can conveniently be obtained and from the modest amount of expensive amine neutralizer that is used to obtain stable water dispersions having useful viscosities.

Useful compositions of the type described in the above patents may contain up to about 25-30% by weight of low cost monomers such as styrene, and usually require in excess of 50% by weight of the expensive epoxy resin. Attempts to use greater proportions of low cost monomers usually result in the loss of the combination of flexibility and barrier properties needed for can liners.

SUMMARY OF THE INVENTION

The present invention provides epoxy resin-based compositions characterized by containing substantial quantities of low cost polymers such as polystyrene (preferably at least 35% by weight) while maintaining the excellent flexibility and barrier properties desired for can coatings. In one embodiment, the invention relates to a coatings composition comprisinq:

(a) The reaction product of
    i. A 1,2-epoxy resin modified in that a portion of its 1,2-epoxy groups are combined with epoxy-reactive groups of an ethylenically unsaturated monomer such as an unsaturated carboxylic acid to provide the resin with unsaturated reactive sites, and
    ii. An addition polymerizable monomer copolymerized with the unsaturated reactive sites of the resin to form an epoxy resin/addition polymer hybrid;

(b) An ionic, resinous composition containing sufficient carboxyl groups to render it and the above described reaction product self dispersible in water in neutralized form (at a pH of about 7 to about 10) which is the reaction product of the remaining 1,2-epoxy groups of the modified epoxy resin with a tertiary amine and a preformed addition polymer containing carboxyl groups; and (c) addition polymer formed associatively (i.e., concurrently) in the preparation via copolymerization of reaction product (a) above but which is not copolymerized with the unsaturated groups of the modified epoxy resin.

The invention in another embodiment relates to a process for preparing the above compositions. A first stage in the process involves the formation of a dispersion of an ionic copolymerizable surfactant that controls solids/viscosity and application characteristics of the coating. A second stage involves the emulsion polymerization of one or more addition polymerizable monomers in the copolymerizable surfactant of the first stage. The process comprises:

reacting (e.g., esterifyinq) a portion of the 1,2 epoxy groups of a 1,2-epoxy resin with an epoxy reactive, ethylenically unsaturated monomer such as a carboxyl functional monomer, preferably, methacrylic acid;

reacting the remaining 1,2-epoxy groups of the epoxy resin with a preformed carboxyl functional addition polymer and a tertiary amine and, in an aqueous dispersion of the resulting reaction product, copolymerizing with the ethylenically unsaturated groups resulting from step (a) an ethylenically unsaturated monomer.

The coating compositions of the invention may conveniently be thought of as comprisinq a blend of resinous moieties in an aqueous dispersion. The resinous moieties comprise a polymer A of the general formula

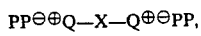

a polymer B of the general formula

PP$^{\ominus}$$^{\oplus}$Q—X—AP, and a polymer C of the general formula

PP$^{\ominus}$$^{\oplus}$Q—X—RR wherein X is a difunctional radical derived from a 1,2-epoxy resin through reaction of one or more of its 1,2-epoxy groups; Q$^{\oplus}$ is a quaternary ammonium group, PP is an addition polymer chain having carboxyl groups forming, with group Q$^{\oplus}$, quaternary ammonium salts; RR is an addition polymer chain having carboxyl groups and bonded to X by an ester linkage; and AP is a different addition polymer chain joined to X by a covalent linking group, preferably an ester, amino or quaternary nitrogen group.

The coating composition also desirably includes a resinous moiety of the formula

RR—X—AP in which RR, X and AP are as defined above.

PP and RR are preferably carboxyl-functional moieties having sufficient carboxyl functionality to establish the blend of polymers as a dispersion in the aqueous medium containing a base. PP and RR, it will be understood, preferably are identical addition polymer chains that differ in their attachment to X, PP being so joined through a quaternary salt linkage and RR being so joined through an ester linkage. The blend also contains a free addition polymer moiety that is not copolymerized with the epoxy resin, this free polymer moiety desirably comprising chains of polymer AP formed associatively with polymer moiety B. Hybrid molecules such as polymer B described above are believed to function to tie the free addition polymer (usually a relatively non-polar polymer) into the polymer blend so that phase separation is minimized. The AP polymer chain and the free addition polymer are desirably formed concurrently during the emulsion polymerization of one or more additional-polymerizable monomers in an aqueous dispersion including polymer moiety A.

DETAILED DESCRIPTION

A composition of the invention, for ease of understanding, can be considered the reaction product of a 1,2-epoxy resin with, first, an unsaturated epoxy-reactive monomer to react with a portion of the 1,2-epoxy groups to provide unsaturated groups; and second, with a preformed carboxyl functional addition polymer and a tertiary amine to consume the remaining 1,2-epoxy groups and to form quaternary ammonium salts and addition polymer esters. The composition, in aqueous dispersion, serves as the vehicle for the second stage emulsion polymerization of one or more addition polymerizable monomers, the latter copolymerizinq with the above unsaturated groups and also underqoinq polymerization to form free polymer chains. The monomers that are emulsion polymerized in the second stage desirably are comparatively low cost monomers such as styrene, and are sometimes referred to herein as "low cost" or "second stage" monomers for purposes of identification.

The initial epoxy resin utilized in compositions of the invention contributes at least about 5 percent by weight of the total polymer solids. The preformed carboxyl functional addition polymer contributes at least about 10 percent and the monomer of the emulsion polymerized low cost addition polymer are incorporated at levels up to about 80 percent. Preferably, the epoxy resin content ranges from about 12% to about 50% by weight and the preformed carboxyl functional addition polymer ranges from about 12% to about 35% by weight of the coatings solids. Most preferably, the epoxy resin content is about 30 to about 40%, the carboxyl functional addition polymer is about 22 to about 26 percent and the monomers used in the second stage emulsion polymerization are about 35 to about 50 percent of solids in the formation of flexible barrier coatings for beer and beverage can liner applications, such percentages being based on weight The present invention is operable with a variety of epoxy resins. However, the epoxy resins which are preferred are aromatic polyethers, particularly those derived from the condensation of bisphenols such as bisphenol A with epichlorohydrin. The preferred epoxy resins have a number average molecular weight (as calculated from 1,2-epoxy group content) of at least about 1000. However, the number average molecular weight of these resins can vary from about 350 to 6000. Although high molecular weight epoxy resins (e.g., having molecular weights of from about 1000 to 5000) can be purchased from manufacturers such as Dow Chemical Co., and Shell Chemical Co., it is often practical to start with lower molecular weight epoxy resins and merely chain extend the same in a known manner with divalent compounds such as bisphenol A, bisphenol F, bisphenol S or their counterparts with hydrogenated aromaticity, or halogenated analogs.

As recognized in the art, epoxy resins prepared by the condensation of bisphenols and epichlorohydrin contain a mixture of diepoxides, monoepoxides and aromatic ethers devoid of epoxy groups. The average functionality of such mixtures may range widely from about 0.2 1,2-epoxy groups per molecule to nearly 2 epoxy groups per molecule. Suitable mixtures of epoxy resins can be obtained by reacting an epoxy having a functionality of between 1 and 2, for example, with a defunctionalizing aqen which is capable of reacting with 1,2-epoxy groups. The defunctionalizing agent can contain, for example, carboxyl groups, hydroxyl groups, amine groups, amide groups or mercapto groups. Specific suitable materials include aliphatic and aromatic carboxylic acids such as benzoic acid, palmitic acid and octanoic acid, unsaturated acids such as acrylic acid, methacrylic acid and linoleic acid, and dibasic acids such as adipic acid or isophthalic acid; hydroxy compounds such as alcohols, phenols or bisphenols, amines such as dipropylamine, amides such as acrylamide or mercaptans such as thiophenol. Defunctionalization with difunctional agents such as the bisphenols and dibasic acids leads to upgrading of the initial epoxy resin to higher molecular weight at the same time as some of the epoxy groups are defunctionalized.

Defunctionalization with unsaturated acids and amines is of particular interest as it is a simple method of introducing reactive sites that can later be copolymerized with monomers of the second stage polymerization to form the hybrid molecules of component (a) described above. These hybrid molecules, having an epoxy polymer portion on one end and an addition polymer portion on the other, are formed in substantial amounts. Without being bound to the following explanation, it is proposed that each hybrid molecule is soluble at one end in the ionic component (b) referred to above and at the other end is soluble in th polymer (including copolymers) of component (c). As the polymers of components (b) and (c) otherwise would tend to be incompatible with each other, the hybrid molecules are believed to contribute to improved compatibility and improved binding between components (b) and (c). The hybrid molecules, which appear to reduce the sharpness of phase boundaries, are thought to provide smoother transfer of stresses between the phases and thus improve flexibility especially under impact conditions. The surprising impact resistance that is characteristic of compositions of the invention supports this theory.

The unsaturated, epoxy reactive monomer used may be substantially any monomer having vinyl unsaturation which also includes a group that is reactive with a 1,2-epoxy qroup of an epoxy resin to covalently link the unsaturated monomer to the resin. Unsaturated acids are preferred. The unsaturated acid may be substantially any unsaturated, carboxyl functional, addition polymerizable acid, such as the unsaturated fatty acids, oleic acid or linoleic acid, or monoesters of unsaturated dibasic acids such as maleic or fumaric acid, but preferably is an acrylic or substituted acrylic acid. Methacrylic acid is most preferred. The unsaturated epoxy-reactive monomer may also be an amine, preferably a tertiary or secondary amine. Exemplary tertiary amines include dimethylaminoethyl methacrylate, dimethylaminoethyl methacrylamide, dimethylaminoethyl acrylate and 4-vinylpyridine, which form, with 1,2-epoxy groups, quaternary ammonium and pyridinium groups. Secondary amines include t- butylaminoethyl methacrylate and i-propylaminoethylmethacrylate. The amines desirably are aminoethyl (primary, secondary or tertiary) esters of (meth)acrylic acid. Of the amines, dimethylaminoethyl methacrylate and t-butylaminoethyl methacrylate are the most preferred. Primary amines are less preferred because of their tendency to chain-extend epoxy resins by reaction with their 1,2-epoxy groups.

In the operation of this invention, it is desirable that the modified epoxy used to form the polymeric surfactant should contain from 0.1 to 0.4 meq/g and preferably from 0.2 to 0.4 meq/g of ethylenically unsaturated copolymerization sites derived from alpha-beta- unsaturated carboxylic acids such as methacrylic acid or alpha-beta-unsaturated amines such as t-butylaminoethyl methacrylate. These copolymerization sites do not take part in the preparation of the ionic polymer component, but are carried along and reacted later.

The ionic polymer component can be prepared by the general methods disclosed in the above-referenced U.S. Pat. No. 4,446,258, or can be prepared in accordance with the procedures described in U.S. Pat. No. 4,247,439 (Matthews and Sommerfeld) or U.S. Pat. No. 4,302,373 (Steinmetz), all of which are incorporated herein by reference.

Briefly, the methods disclosed in the above patents involve the reaction of 1,2-epoxy groups of an epoxy resin with a preformed addition polymer containing carboxyl groups and with a tertiary amine. It is believed that the reactions at the 1,2 epoxy groups are competitive between the carboxylate ion of the amine neutralized addition prepolymer and the free tertiary amine. In any event, the respective products formed are the hydroxy ester of the epoxy with the carboxyl-containing addition polymer and a quaternary ammonium group generated from the tertiary amine and the 1,2-epoxy qroup of the epoxy component. Reaction conditions, including the presence of water as a reaction modifier, can be chosen to favor either the esterification or quaternization reaction. By varying the ratio of the reactants and reaction conditions, the solids content, viscosity, particle size and application properties of the product can be varied over a wide range. At a minimum, at least about 5 percent of the 1,2-epoxy resin groups of the epoxy resin should be converted to epoxy/addition polymer ester groups. The reaction is carried out so that the ionic component is substantially free of unreacted 1,2-epoxy groups. The resulting composition, which may require further neutralization with amine, is readily dispersed in water to form a stable dispersion.

The preformed carboxyl containing polymer is prepared by the addition polymerization of ethylenically unsaturated monomers comprising at least about 10 percent of ethylenically unsaturated carboxylic acid based on the total weight of the monomers. Polymers and copolymers of this type are well known, although copolymers with particularly high proportions of carboxylic acid as are preferred herein are unusual. Preferably, the preformed carboxyl containing polymer is a copolymer of a (meth)acrylic acid with ethylenically unsaturated monomers which are non reactive under the contemplated conditions of the condensation reaction with epoxy resin. As used herein, "(meth)acrylic" refers to both acrylic and methacrylic moieties. Suitable non-reactive monomers are (meth)acrylate esters such as methyl, ethyl and butyl (meth)acrylates; styrene, methylstyrene, vinyl acetate, vinyl chloride, vinylidene chloride, acrylonitrile, and the like. The function of these monomers is to provide good film formation and end use properties. Otherwise, the nature and proportions are not critical to this invention. Reactive monomers such as 2-hydroxyethyl methacrylate and amide monomers such as acrylamide and N-methylol acrylamide can be used in small percentages to provide additional crosslinking sites when a high level of crosslinking is desired.

The presence of a large proportion of carboxyl functional monomers in the preformed polymer is essential. The preferred minimum proportion of carboxyl monomers is 30 percent of the monomers used to prepare the preformed carboxyl containing polymer. Methacrylic acid provides the best hydrolytic stability and is preferred, but other acids such as acrylic acid, maleic acid, fumaric acid, itaconic acid, crotonic acid and the like are useful. Up to about 80 percent of the monomers can be carboxyl functional, the maximum being determined by the retention of solvent solubility of the polymer.

The preferred preformed carboxyl containing polymers generally have number average molecular weights, as determined by gel permeation chromatography, in the range of 2000 to 30,000; most preferably 5000 to 20,000. Molecular weight can be controlled by monomer content during polymerization, initiator concentration and polymerization temperature in the known manner. Mercaptan chain termination is preferably avoided especially where the product is intended for use in the coating of sanitary cans because of the offensive odor of mercaptans.

Generally, the preformed, carboxyl containing addition polymer is reacted with the modified epoxy resin (previously partially reacted with an unsaturated, epoxy reactive monomer) as a solvent solution in the presence of sufficient amine, preferably tertiary amine, to promote the reaction. The preferred tertiary amine is dimethylaminoethanol but other tertiary amines such as trimethylamine, dimethylbenzylamine, triethylamine, dimethyl ethyl amine, dimethyl 3-hydroxypropyl amine, N-methyl morpholine, N,N,N'N'-tetramethlethylenediamine, N,N'-dimethylpiperazine and the like can be used. The amount of amine can vary widely. In conditions where the remaining oxirane functionality is very low, as little as about 0.2 percent of amine based on the total weight of reactants can be used or the amount can be much larger, ranging up to about 10 percent or more of the reactants.

Another way to define the amount of amine used is in relation to the total carboxyl content of the preformed carboxyl-containing polymer. The amount of amine present during the reaction of the epoxy resin and the preformed carboxyl polymer will be sufficient to neutralize from about 5 to about 70 percent of the carboxyl groups in the preformed polymer. Preferably the amount of amine is sufficient to neutralize between 10 and about 50 percent of the carboxyl groups of the preformed carboxyl-containing polymer. Still another way of defining the amount of tertiary amine present during the reaction of the epoxy resin and the preformed carboxyl polymer is by use of an equivalent ratio of amine to 1,2-epoxy group of from about 1 to about 3 to assure that gelation does not take place when epoxy resins of low molecular weight (high 1,2-epoxy content) are used.

The amount of tertiary amine has a significant effect on the nature of the product of the reaction. In general, the smaller the amount of amine present during the reaction, the higher the viscosity of the product. This difference is apparent in both the solvent solution and when the product is dispersed in water. The effect of the amount of amine used is observed even where the total amount of amine present in the dispersed product is identical.

Thus, for example, the same product is not obtained when the amine is present at the 40 percent neutralization level during the reaction as when amine sufficient to neutralize 5 percent of the carboxyl groups is present during the reaction and is supplemented with 35 percent of the neutralization amount prior to dispersion in water.

The resinous product resulting from the reaction of the modified epoxy resin with amine and unsaturated carboxyl containing monomer provides a copolymerizable polymeric surfactant, a water dispersion of which may now be used for the in situ second stage polymerization of ethylenically unsaturated, addition polymerizable monomers which may be or include relatively low-cost monomers. The components of this second stage polymerization can be chosen from a wide variety of unsaturated monomers. For example, there may be mentioned acrylic and methacrylic acids and their methyl, ethyl and butyl esters; aromatic monomers such as styrene, methyl styrene and vinyl toluene; vinyl and vinylidene halides, acrylonitrile, isoprene, butadiene and the like. For certain applications it may be advantageous to include in the copolymer functional monomers such as acrylamide, N-methylolacrylamide and i-butoxymethylol acrylamide or hydroxyethyl acrylates and methacrylates. Presently, preferred monomers include styrene, acrylonitrile, and butyl acrylate.

The above monomers may be added batchwise or over a period of time to the aqueous dispersion together with suitable free radical initiators of either the thermal or redox initiating type. The reaction is conducted under conditions resulting in the polymerization of the added monomers and the copolymerization of a portion of these monomers with the unsaturation present in the epoxy resin portion due to the earlier esterification of a portion of the 1,2-epoxy groups with unsaturated carboxylic acid.

The second stage addition polymerization can conveniently be initiated by any one of a number of organic or inorganic peroxides that are sufficiently active to be effective at the temperatures used in emulsion polymerization. Thermal initiators are typified by t-butyl peroxypivalate, azobisisobutyronitriles and benzoyl and lauroyl peroxides. Redox initiators can be chosen from oxidizers such as hydrogen peroxide, t-butyl hydroperoxide and ammonium persulfate used together with reducing agents such as alpha-hydroxy ketones, ascorbic acid, hydrazine and alkali metal or ammonium sulfites, bisulfites, metasulfites or hydrosulfites. Preferred initiators of this invention tend to generate little or no ionic materials that remain in the film after cure to render it water sensitive. The most preferred initiators are the azobisisobutyronitriles, t-butyl peroxypivalate, and redox systems formed from alpha-hydroxy ketones such as benzoin or acetol used with hydrogen peroxide or t-butyl hydroperoxide.

In the preparation of the defunctionalized epoxy of the first stage polymer, 10 to 50 percent and preferably 20 to 40 percent of the 1,2-epoxy end groups are esterified with unsaturated carboxylic acid or otherwise reacted with epoxy reactive unsaturated monomers to provide unsaturated copolymerization sites for later reaction with second stage monomers. The balance of the 1,2-epoxy groups yield ionic polymer moieties by quaternization or by esterification with carboxyls from the preformed addition polymer with the balance of the addition polymer carboxyls being neutralized with tertiary amine that is in excess of that used in the quaternizing reaction.

During the second stage polymerization, the ionic polymer of the first stage serves as an effective surfactant for the emulsion polymerization of the second stage monomers. Moreover, the epoxy component of the surfactant contains moieties that are monofunctional and difunctional in unsaturated end groups and that are active toward copolymerization with the second stage monomers. In the second stage polymerization, a portion of the polymer formed arises from polymerization of the monomers alone to form a free polymer, but hybrid polymer species are also formed by copolymerization of the second stage monomers with the active unsaturated end groups on the epoxy. The presence of difunctional unsaturated species would likely lead to network formation if epoxy copolymerization were to occur, with the eventual formation of a microgel fraction. The observation that the products of this invention are only partially soluble in strong solvents demonstrates the presence of a microgel fraction and indicates that substantial amounts of hybrid molecules arise out of copolymerization of the unsaturated end groups of the epoxy with the second stage monomers.

Comparative Examples A and B below show the effect of epoxy copolymerization on otherwise identical systems containing 40 percent styrene as the second stage monomer. The modified epoxy resin of comparative Example A contains unsaturated methacrylate copolymerization sites (from esterification with methacrylic acid), while the modified epoxy resin of comparative Example B contains an equivalent amount of non copolymerizable (saturated) sites derived from esterification with acetic acid instead. The Example A product is only partially soluble in strong solvents such as N,N-dimethylformamide, indicating copolymerization and microgel formation has occurred. The Example B product is easily and completely soluble in the same solvent. The Example A product, in spite of its microgel content, cures to films that are clear, glossy, flexible and impact resistant. The Example B product also cures to a clear, glossy product, but the impact resistance is very poor as evidenced by severe stress cracking in impacted areas.

The coating composition of the present invention is usually clear, but it can be tinted, pigmented and/or opacified by known methods. The composition can be applied satisfactorily by any conventional method known to the coating industry. Spraying, rolling, dipping, flow coating and electrodeposition methods can be used for both clear and pigmented films. The compositions of the invention can be used to coat a variety of substrates, but the preferred compositions have particular utility as coatings for beverage and food cans.

Coating compositions intended for beer and other beverage can liner applications normally do not require crosslinkers to achieve required end use properties. When the end use is for very aggressive foods such as sauerkraut, tomato paste or the like, however, the composition may benefit from augmentation with hardening/crosslinking agents such as aminoplasts and phenoplasts in the amount of 1-25 percent, preferably 3-10 percent, based on the solids weight of the composition.

For metal substrates intended for beer and other beverage containers, the coating is usually applied to give a dry film weight of about 1 to 10 milligrams of coating per square inch (about 0.15 to about 1.5 mg/cm$^2$). The film thickness of such coatings is usually less than about 0.3 mils (about 0.08 mm). To meet the very demanding requirements of can liner application and end use, a number of testing procedures are employed to define the suitability of a given composition for commercial use.

The normal screening tests for can liners are met in full measure by the preferred compositions of this invention. The tested parameters include good storage stability of the composition, excellent adhesion, resistance to blush on pasteurization, and coverage of the can interior as determined by an enamel rater together with the ability to form a continuous film on spraying without blistering and foaming.

Tests used in the following examples are designed to assure that the inclusion of enhanced amounts of low cost "extender" addition polymers by the compositions of this invention do not compromise the effectiveness as can liners. To be considered acceptable for general beer and beverage can liner use, the coating compositions should meet the above parameters and should pass the following tests:

Flavor Test: The cured coating on the can should neither impart nor subtract flavor from the contents nor should it absorb ambient odors which could later be imparted to can contents, especially beer.

Reverse Impact Test: A cured coating on aluminum can stock at the coating weight used for beer cans is subjected to impact by a falling dart on the uncoated side at a level of 8 inch pounds (9.14 Kg-cm). An acceptable panel will show no sign of stress cracking when viewed without magnification under conditions of oblique indirect lighting.

Dropped Can Test: A can, sprayed and cured under commercial conditions, is given an enamel rater test, i.e., it is filled with 1% salt (NaCl) solution and a low voltage is applied between an immersed electrode and the can body. Current flow in the circuit is measured, and the integrity of the film is related to the current flow and area exposed to the electrolyte. For 12 oz. can sizes (354 ml.) an acceptable rating is in the range of 0-2 milliamperes for beverage cans and 0-10 milliamperes for beer. Cans from the same batch are filled with water and dropped down a tube from a height of two feet (about 61 cm.) so that their bases hit an inclined plane at a 45 degree angle and are thus dented as they might be if dropped in transit. Cans, so dented, should have enamel rater values no more than 1 milliampere greater than control (undented) cans to be fully acceptable.

"Tab" Resistance Test: To measure the resistance of a coating to a moderately aggressive resistance of a coating to a moderately aggressive environment, a can end is fabricated from cured coated aluminum end stock. It is immersed on edge for three days at 100° F. in a carbonated cola beverage such as "Tab" Cola (a trademarked product of Coca Cola Co.), and is then examined for loss of adhesion, blistering and whitening of the coating. The presence of any one of these three indications of product sensitivity, except for very slight blush, renders the product unacceptable as a coating for beverage cans.

The invention is further illustrated by the following non-limiting examples:

EXAMPLE I

A polymerization reactor is charged with 1458.6 g ethylene glycol monobutyl ether and 625.2 g butanol. In a separate vessel a premix is made of 1881.1 g glacial methacrylic acid, 1068.8 g styrene, 1325.3 g ethyl acrylate and 106.9 g t-butyl perbenzoate. An inert gas blanket is started and the solvents are heated to 121° C. Ten percent of the premix is added. The heat is increased to obtain reflux and the remainder of the premix is added over two hours. Reflux is maintained for an additional hour. Then 507.7 g ethylene glycol monobutyl ether, 112.4 g ethylene glycol monohexyl ether and 2914.0 g butanol are added. The acrylic prepolymer solution has a solids content of 42.6% and acid number of 280 based on solids content and a viscosity of 5500 centipoise.

A second reactor is charged with 1218.4 g of an epoxy resin (Epon 828, Shell Chemical Co.) 529.8 g bisphenol A, 191.9 g ethylene glycol monobutyl ether and 3.4 g tributylamine. Under an inert gas blanket, the temperature is raised to 140° C. The heat is turned off and the reaction is allowed to exotherm to 180° C. The temperature is then reduced to 150° C. cover the next 30 minutes at which time the 1,2-epoxy group content as measured by HBr titration in glacial acetic acid to the crystal violet end point is 1.04 meq/g. A premix of 84.5 g ethylene glycol monobutyl ether, 46.7 g glacial methacrylic acid and 0.3 g butylated hydroxytoluene (BHT) is added over a 2-3 minute period. The temperature is held for 30 minutes at which time the 1,2 epoxy content falls to 0.73 meq/g, i.e. the 1,2 epoxy content is reduced by an amount which is equivalent to the amount of acid introduced. The acid number also falls to a value of 1.0 or less, indicating greater than 95 percent reaction of the acid. Ethylene glycol monohexyl ether (22.0 g) is added followed by 67.3 g ethylene glycol monobutyl ether and 2464.3 g acrylic prepolymer solution. Finally, 331.9 g deionized water is added and the reaction temperature is adjusted to 80° C. With good agitation, 165.9 g dimethylaminoethanol is added in 5-7 minutes. The temperature is raised to 90° C. and held for 50 minutes when 129.4 g additional water is added. The reaction is held for 10 minutes, and then is made into a dispersion by adding 4744.3 g deionized water. This copolymerizable surfactant dispersion has a solids content of 28.8 percent, an acid number of 84 based on solids, an average particle size as measured by light scattering of less than 0.18 microns, and a pH of 7.0. All 1,2-epoxy groups have been consumed.

The Epon 828 epoxy resin referred to in this example has an epoxy equivalent weight of about 187 and is chain-extended by the bisphenol A to an equivalent weight of about 944. In the above reaction, which is typical of the first stage polymer formation in the subsequent examples, an epoxy resin of calculatable molecular weight and 1,2-epoxy content is formed by the condensation of bisphenol A and its diglycidyl ether. This resin is largely terminated with 1,2-epoxy groups. A portion of these 1,2-epoxy groups is then esterified with unsaturated carboxylic acid; then substantially all of the remaining 1,2-epoxy groups are reacted with tertiary amine and carboxyl containing polymer. A variety of products is formed. Some moieties are copolymerizable with second stage "extender" addition polymerizable monomers because of the unsaturated ester content, while others have excellent surfactant properties derived from their ionic content. The application properties of the second stage dispersion and of the final product can be varied broadly by controlling the initial level of 1,2-epoxy groups and dimethylaminoethanol, and the relative amounts of copolymerizable and ionic sites introduced. In Example I, the epoxy polymer contained 1.04 meq/g of 1,2-epoxy groups of which (by calculation) 71 percent were converted to ionic end groups (through reaction with the preformed polymer and tertiary amine), and 29 percent to copolymerizable end groups (through reaction with methacrylic acid). However, the epoxy resin will normally contain from about 0.3 to 1.6 meq/g of 1,2-epoxy groups which will be converted to produce from 10-50 percent unsaturated ends and 50 90 percent ionic ends.

The copolymerizable surfactant dispersion prepared above (5844.5 g) is then transferred to another reactor where it is diluted with 3144.5 g deionized water and neutralized further with 37.5 g dimethylaminoethanol. Styrene (936.0 g) and 9.4 g benzoin are added and the temperature is raised to 80° C. under an inert gas blanket. Hydrogen peroxide (30%) 28.0 g, is added to the reactor and after a small initial exotherm the temperature is raised to 85° C. and held for two hours at which time polymerization is complete. The product has a solids content of 26.2 percent, an acid number of 55, a particle size of 0.14 micron and a pH of 7.2. The polymer is partially insoluble in hot N,N-dimethylformamide, showing copolymerization has occurred to produce microgel.

The above dispersion (145 lbs., 65.8 kg) is easily formulated into a sprayable can liner finish at 18.7 percent non volatiles by adding 22.5 lbs. (10.2 kg) deionized water, 2.3 lbs. (1.04 kg) butanol and 2.7 lbs. (1.22 kg) ethylene glycol monobutyl ether followed by sufficient dimethylaminoethanol to adjust the viscosity to about 24 seconds No. 4 Ford Cup at 80° F. (26.7° C.). The formulated finish has excellent spray properties, is storage stable, and after curing for 30 seconds or more at 400° F. (204° C.) metal temperature, is entirely suitable for the spray lining of beer and beverage cans. It is characterized by the formation of crosslinked coatings without the need for external crosslinkers, and by excellent coverage of the can interior even at coating weights as low as 2-3 milligrams/square inch (about 0.3-0.5 mg/cm$^2$). Protection of can contents is maintained even after the full can is dropped so as to dent it severely. Cans so treated pass, on average, less than two milliamperes of current when filled with 1% salt solution. This is rather surprising as the coating contains no flexibilizing components but does contain 48 percent by weight of styrene which would be expected to contribute to a hard, brittle coating. The coating did not affect the flavor of the beer packed against it nor did it absorb ambient odors that later could be released to affect beer flavor.

COMPARATIVE EXAMPLE A

A suitably equipped reactor is charged with 625.2 g butanol and 1458.5 g ethylene glycol monobutyl ether. In a separate vessel a premix is made of 1795.5 g methacrylic acid, 1282.5 g styrene, 1197.0 g ethyl acrylate and 107.0 g t-butyl perbenzoate. Heating and inert gas blanket are started. Ten percent of the premix is added and the mixture is brought to the reflux. The remaining premix is added evenly over two hours. Reflux is maintained for an additional hour. Then 507.7 g ethylene glycol monobutyl ether, 112.4 g ethylene glycol monohexyl ether and 2914.1 g butanol are added and the reactor is discharged. The preformed polymer product has a non volatiles content of 42.4% and an acid number of 269.

Another reactor is charged with 1268.0 g Epon 828 (Shell Chemical, as defined above), 515.8 g bisphenol A, 198.5 g ethylene glycol monobutyl ether and 3.5 g tributylamine. The reactor is heated to 140° C. under inert gas. The heat is turned off and the reaction is allowed to exotherm to 176° C. after which the temperature is reduced to 150° C. over a 30-minute period. At this time a premix of 87.3 g ethylene glycol monobutyl ether, 46.3 g methacrylic acid and 0.3 g BHT is added. The temperature is adjusted to 145° C. and held for 30 minutes to consume the methacrylic acid and reduce oxirane content to 0.90 meq/g. The above acrylic prepolymer (2778.0 g) is added followed by 35.0 ethylene glycol monohexyl ether 100.0 g ethylene glycol monobutyl ether and 300.0 g deionized water. The temperature is adjusted to 80° C. and 160.0 g dimethylaminoethanol is added over 3-5 minutes at high agitation. The temperature is increased to 95° C. and held for one hour, after which 4496.5 g of deionized water is added. A dispersion of copolymerizable surfactant is formed at 31 percent solids having an acid number of 74 and an average particle size of 0.13 microns. The bisphenol A-extended epoxy resin of this example contains 1.20 meq/g of 1,2-epoxy groups of which 25 percent are reacted with the methacrylic acid to form unsaturated hydroxy ester groups.

The resulting copolymerizable surfactant (773.6 g) is diluted with 494.8 g deionized water and further neutralized with a mixture of 6.0 g dimethylaminoethanol and 61.5 g water. It is heated to 80° C. under an inert gas blanket at which time a solution of 1.9 g of 2,2' azobis (2-methylbutanenitrile) in 156.0 g styrene is added over a 5 minute period. After an initial exotherm a temperature of 85° C. is held for two hours to complete the polymerization. The coating composition formed is at 26% solids with an acid number of 48 and a particle size of 0.12 microns. It contains a very substantial portion of solids that remain insoluble in hot N,N -dimethylformamide.

Finish made by addition of solvent and water to the above composition gives cured films (2 min. 400° F.) with excellent reverse impact and product resistance properties.

COMPARATIVE EXAMPLE B

The compositions and procedures of Comparative Example A are followed with the single exception that the methacrylic acid of the second paragraph of that Example is replaced with an identical number of equivalents of acetic acid. This results in a polymeric surfactant that includes only saturated hydroxy ester groups and hence is not copolymerizable. It is completely soluble in cold N,N -dimethylformamide.

The coating composition from this procedure has a solids of 26.2, acid number of 49.7 and particle size of 0.18 microns. The finish, formulated as in Comparative Example A above and subjected to the same application and curing conditions, gives very dense stress cracking on impacting and is totally unacceptable as an effective coating.

EXAMPLE II

This example uses octanoic acid as well as methacrylic acid esterification to reduce difunctionality of the epoxy resin. A 5 liter reactor is charged with 510.0 g of DER 331 (Dow Chemical Co.) epoxy resin, 197.2 g bisphenol A, 77.6 g ethylene glycol monobutyl ether and 1.4 g tributylamine. An inert gas blanket is started and the charge is heated to 135° C. With the heat off, the temperature is allowed to rise to 180° C. and is then reduced to 150° C. over 30 minutes. A premix of 34.2 g of ethylene glycol monobutyl ether, 18.2 g glacial methacrylic acid, 30.5 g octanoic acid and 0.1 g BHT is added. The temperature is held at 150° C. for 30 minutes to give an acid number of less than 1.0. Ethylene glycol monohexyl ether (8.9 g) and ethylene glycol monobutyl ether (27.2 g) are added followed by 1038.6 g of the acrylic prepolymer of Example I. At 80° C., a premix of 75.6 g dimethylaminoethanol and 70.0 g deionized water is added over about 5 minutes. The temperature is adjusted to 90° C. and held for one hour. Deionized water (1910.4 g) is then added to form a dispersion at 30 percent solids. The acid number is 82, the disperson has a Brookfield viscosity of 8200, its pH is 6.9 and its particle size is very small. The bisphenol A extended epoxy resin has a 1,2-epoxy content of 1.4 meq/g. Based on the available reactive 1,2-epoxy end groups, the esterified epoxy has (calculated) 21.5 percent copolymerizable methacrylate end groups, and 21.5 percent non-reactive octanoate end groups. The remaining 53 percent are formed by quaternization and by esterification with the carboxyl-containing preformed polymer.

In the second stage polymerization, styrene is copolymerized with the unsaturated methacrylate end groups of the dispersed polymer. As the result of the octanoic acid defunctionalization, microgel content is reduced in comparison to the product of Example I. The first stage dispersion (780.0 g) is transferred to a 2 liter reactor and is diluted with 557.6 g of deionized water. The pH is then increased from 6.90 to 7.20 with dimethylaminoethanol. Styrene (156.0 g) and benzoin (1.6 g) are added and emulsified with vigorous stirring. An inert gas blanket is started and the temperature is raised to 80° C. at which point 4.8 g of 30% hydrogen peroxide is added. This temperature is held for two hours to give substantially complete monomer conversion. The solids content of the product is 26.1%, the acid number is 54, the viscosity is 175 centipoise and the particle size is very small. Like the product of Example I, films cured from this dispersion have excellent impact resistance and product resistance when exposed to Tab Cola for three days at 100° F. (37.8° C.).

EXAMPLE III

A reactor is charged with 18.59 lbs (8.44 Kg) of Epon 828 epoxy resin, 8.24 lbs (3737.7 g) polymer grade bisphenol A, 2.98 lbs (1351.7 g) ethylene glycol monobutyl ether and 0.05 lb (22.7 g) tributylamine. An inert gas blanket is started and the charge is heated to 320° F. (160° C.) The heat is turned off and the exotherm is allowed to carry the temperature of 340°-360° F. (171°-182° C.). After peak temperature is reached, the reaction is held for 30 minutes allowing the temperature to fall back to 308° F. (about 153° C.). A premix of 1.31 lbs (594.2 g) of ethylene glycol monobutyl ether, 0.69 lb (313 g) glacial methacrylic acid and 2.3 g BHT is added in 2-3 minutes and the temperature is held for 30 minutes at 288° F. (142.2° C.) at which time the oxirane content is 0.69 meq/g and the acid number is less than 1.0. Ethylene glycol monohexyl ether (0.53 lb, 240.4 g) is then added followed by 1.5 lb (680 g) ethylene glycol monobutyl ether, 41.67 lbs (18.90 Kg) of the acrylic prepolymer of Comparative Example A and 4.5 lbs (2041 g) of deionized water. The mixture is heated and stirred until uniform. At 198° F. (92.2° C.) 2.4 lbs (1089 g) of dimethylaminoethanol is added over 3-5 minutes. The temperature is held at 205° F. (96.1° C.) for one hour. The reactor contents are then dispersed by pumping into agitated deionized water to give a dispersion at 30.3 percent solids with an acid number of 87 and a Brookfield viscosity of 1200 centipoises. The resin is terminated 70% with ionizable groups and 30% with copolymerizable methacrylate groups, by calculation.

To copolymerize styrene with above methacrylate groups, 101.8 lbs (46.176 Kg) of the above dispersion is charged back to the reactor and neutralized further with a mixture of 1.62 lbs (734.8 g) of dimethylaminoethanol in 8.1 lbs (3674 g) of deionized water; then 65.1 lbs (29.529 Kg) of additional water is added. An inert gas blanket is applied and heating is started. At 170° F. (76.7° C.), a premix of 20.5 lbs (9299 g) of styrene and 0.25 lbs. (113.4 g) of 2,2'-azobis(2 methylbutanenitrile) is added over 15 minutes. The temperature is raised to 185° F. (85° C.) and held for two hours for complete conversion. The product has a solids content of 25.9 percent, acid number of 52, pH of 7.6 and Brookfield viscosity of 3900 centipoise. The residual styrene monomer content, as determined by gas chromatography, is 923 ppm. The product is not completely soluble in hot N,N-dimethylformamide, thus indicating the presence of microgel from the styrene copolymerization.

The above dispersion (144.8 lbs., 65.68 kg) is formulated into a sprayable can liner finish at 18.7% nonvolatiles by adding 43.1 lbs. (19.6 kg) deionized water, 5.7 lbs. (2.6 kg) butanol and 5.8 lbs. (2.6 kg) ethylene glycol monobutyl ether followed by sufficient dimethylaminoethanol to adjust the viscosity to 24 seconds as measured by No. 4 Ford Cup at 80° F. (26.7° C.). Spray application provides blister-free can linings of excellent metal coverage that passed, on average, no more than four milliamperes of current in the enamel rater test. Film integrity was not affected by dropping full cans to severely dent their bases. This is a very high performance level for the purpose intended. Furthermore, the coating showed no tendency to blush on pasteurization and had excellent resistance to Tab brand cola when exposed at 100° F. (37.8° C.) for three days, nor did it affect the flavor of beer packed against it.

EXAMPLE IV

The polymeric surfactant described in the first paragraph of Example III (2244.6 g) is charged to a 5 liter reactor. It is diluted with 1293.4 g of deionized water and neutralized further with 32.8 g of dimethylaminoethanol. The reactor is inert gas blanketed and heated to 71° C. Styrene (416.8 g), followed by a premix of 0.3 g t-butyl hydroperoxide (90%) in 3 g water is added and dispersed evenly; then a premix of 0.9 g of 45% ammonium bisulfite in 9.0 g water is added and the reaction mixture is held at 70°-75° C. for two hours to effect high monomer conversion. The product has a solids content of 25.8% and an acid number of 50. Its film properties are similar to the product of Example III except that it shows a modest amount of blistering and adhesion loss when exposed to Tab Cola.

EXAMPLE V

In this example, which shows the use of adipic acid to flexibilize the epoxy resin, a 5 liter reactor is charged with 507.0 g of Epon 828 epoxy resin, 135.9 g bisphenol, A, 58.2 g adipic acid, 79.6 g ethylene glycol monobutyl ether and 1.4 g tributylamine. An inert gas blanket is started and the charge is heated to 135° C. With the heat off, the temperature rises to 180° C. and is then cooled to 160° C. over 30 minutes. A premix of 34.9 g ethylene glycol monobutyl ether, 18.9 g methacrylic acid and 0.1 g BHT is added. The temperature is held at 150° C. for 30 minutes to complete esterification by the methacrylic acid. The resulting product has an epoxy content of 0.70 meq/g and an acid number of less than 1.0. The preformed acrylic polymer of Comparative Example A (1128.9 g) is then added and the temperature is adjusted to 110° C. Dimethylaminoethanol is added over 3-5 minutes and the reaction is held at 110° C. for one hour and then 1968.3 g of deionized water is added slowly to form a very small particle size dispersion at 30.4 percent solids and with an acid number of 80.

The above dispersion (769.7 g) is transferred to a 2 liter reactor, diluted with 552.9 g of deionized water and neutralized with 11.4 g dimethylaminoethanol. Styrene (156.0 g) is added and dispersed. An inert gas blanket is started and the temperature is raised to 71° C. A premix of 0.13 g t-butyl hydroperoxide (90%) and 1.3 g water is added followed by a premix of 0.78 g of 45% ammonium bisulfite in 7.8 g water. Temperature is held for two hours to yield a product at 25.8 percent solids. When cured on aluminum panels, the composition exhibits good reverse impact resistance in film weights up to about 4 mg/sq. in. (about 0.6 mg/cm²) but is somewhat deficient at higher film weights.

EXAMPLE VI

This example uses acrylic rather than methacrylic acid esterification of the epoxy resin to produce copolymerization sites. A 5 liter reactor is charged with 518.0 g of Epon 828 epoxy resin, 198.5 g bisphenol A, 79.4 g of ethylene glycol monobutyl ether and 1.4 g of tributylamine. Epoxy upgrading is carried out as before for 30 minutes to give an epoxy resin containing 1.4 meq/g of 1,2-epoxy groups. At 150° C., a premix of 34.9 g ethylene glycol monobutyl ether, 15.5 g glacial acrylic acid and 0.12 g BHT is added in 2-3 minutes, and a temperature of 145° C. is held for an additional 30 minutes at which time the 1,2 epoxy content is reduced to 1.1 meq/g. The acrylic prepolymer of Comparative Example A (1111.2 g) is added and the temperature is adjusted to 85° C. Ethylene glycol monohexyl ether (14.0 g) and ethylene glycol monobutyl ether (40.0 g) are added. Deionized water (250.0 g) and dimethylaminoethanol (100.0 g) are premixed and added over 3-5 minutes. A reaction temperature of 85° C. is held for one hour at which time the acid number falls to a constant value calculated to be equal to the complete consumption of 1,2-epoxy groups. The clear reaction mass is dispersed by addition of 2074.0 g deionized water to form a 27% solids dispersion. The epoxy molecules of this example have approximately 79% ionic and 21% unsaturated end groups, by calculation.

The dispersion (838.7 g) is transferred to a 2 liter reactor and diluted with 499.6 g of deionized water. A nitrogen blanket is started. At 80° C., 156.0 g of styrene and 1.56 g benzoin ar stirred in followed by 4.7 g of 30% hydrogen peroxide. The temperature is raised to 85° C. and held for two hours to provide high monomer conversion. Dispersion solids is 25.7% and the acid number is 51. Film evaluations show excellent pasteurization and Tab Cola resistance. Flexibility and reverse impact resistance are good. The impacted panels show slight stress whitening but no cracking or adhesion loss.

EXAMPLE VII

An acrylic prepolymer is made from the following ingredients in a suitably equipped five liter reactor:

|  | Weight, g |
| --- | --- |
| Butanol | 900.0 |
| Ethylene glycol monobutyl ether | 500.0 |
| Ethylene glycol monohexyl ether | 850.0 |
| Isooctanol | 250.0 |
| Methacrylic Acid | 840.0 |
| Styrene | 420.0 |
| Ethyl Acrylate | 140.0 |
| Benzoyl Peroxide (70% in H$_2$O) | 100.0 |

The first four ingredients are charged to the reactor. The remaining ingredients are premixed. A nitrogen blanket is established and twenty percent of the premix is added to the reactor. The charge is heated to 93° C. and held 15 minutes. The remaining premix is added to the reactor over 5 hours at 93° C. The reaction is held for 2 more hours at this temperature. The product has a solids content of 35 percent and an acid number of 390.

A self dispersing copolymerizable epoxy acrylic dispersion is prepared as follows. Epoxy resin (DER 331, Dow Chemical Co.) 500.5 g, bisphenol A 249.5 g, ethylene glycol monobutyl ether 56 g, and tributylamine 1.5 g are charged to a 5 liter flask with nitrogen blanket. The reactants are heated to 140° C. after which an exothermic reaction takes place. A temperature of 155° C. is held until the epoxy value reaches 0.60 meq/g. Methacrylic acid (19.4 g) in mixture with 33.5 g each of butanol, ethylene glycol monobutyl and monohexyl ethers and 0.3 g butylated hydroxy toluene is added. A temperature of 140° C. is held until the epoxy/acid esterification is complete. The acrylic prepolymer (714.3 parts) is then added together with 18.5 g of dimethylaminoethanol. A temperature of 110° C. is held for 3 hours. Dimethylaminoethanol (42.3 g ) is added, then 2350 g of water is added to give a small particle size dispersion with a non-volatile solids content of 25.0% and pH of 7.1. In this procedure, about 50% of the initial 1,2 epoxy groups are converted (by reaction with methacrylic acid) to copolymerizable species and the remaining 50% to ionic species.

Five hundred grams of the above dispersion is charged to a 2 liter reactor, diluted with 544.8 g deionized water and neutralized further with 3.0 g dimethylaminoethanol. An inert gas blanket is started and the charge is heated to 70° C. A premix is made of 2.9 g ethylene glycol monobutyl ether, 3.0 g ethylene glycol monohexyl ether, 3.5 g butanol, 0.7 g i-octanol, 64.4 g styrene, 37.8 g acrylonitrile and 1.4 g t-butyl peroxypivalate (75% in mineral spirits). The premix is added to the reactor and a temperature of 70° C. is regained. The reaction is held at 70° C. for 2 hours; then an additional 0.5 g t-butyl peroxypivalate is added. The reaction is held an additional hour at 70° C. and then another hour at 90° C. to reach substantially complete conversion. The product has a solids of 18.6%, acid number of 52, pH of 7.9 and particle size of 0.22 micron. Panel film evaluations showed no water sensitivity and excellent resistance to Tab Cola. Reverse impact resistance at 12 in. lb. was excellent in films up to and including 9 mg/sg. in. (1.4 mg/cm$^2$) film weight on aluminum.

EXAMPLE VIII

A suitably equipped reactor is charged with 29.17 lbs. (13.232 Kg) ethylene gylcol monobutyl ether and 12.50 lbs. (5670 g) butanol. A monomer/initiator premix is made from 35.06 lbs. (15.903 Kg) glacial methacrylic acid, 33.27 lbs. (15.091 Kg) styrene, 17.1 lbs. (7757 g) ethyl acrylate and 2.14 lbs. (971 g) t-butyl perbenzoate. The reactor is inert gas blanketed and heated to 250° F. (121° C.), whereupon 10% of the premix is added and heating is continued to the reflux at about 266° F. (about 130° C.). The remainder of the premix is added at a uniform rate over 2 hours at the reflux. Reflux is continued for 1 hour, then the charge is diluted with 10.15 lbs. (4604 g) ethylene glycol monobutyl ether, 2.25 lbs. (1021 g) ethylene glycol monohexyl ether and 58.28 lbs. (26.436 Kg) butanol. The product has a solids content of 42.5%, an acid number of 249 and a Brookfield viscosity of 6100 centipoise.

A 12 liter reactor is charged with 1118.5 g Epon 828 epoxy resin, 496.9 g bisphenol A, 179.1 g ethylene glycol monobutyl ether and 3.2 g tributylamine. Upgrading is carried out as before and held for 30 minutes past peak temperature to give a 1,2-epoxy content of 1.0 meq/g which was further reduced to 0.70 meq/g by reaction with 41.7 g methacrylic acid introduced as a solution in 78.6 g ethylene glycol monobutyl ether. This reaction is completed in 45 minutes at 150° C. as indicated by an acid number less than one. The acrylic prepolymer prepared above (2505.3 g) is added, and the temperature is adjusted to 110° C. Dimethylaminoethanol (121.0 g) is added over 3-5 minutes followed by 50 g deionized water. After one hour the acid number falls to 77 indicating the epoxy/acrylic/amine reaction is complete. The degree of neutralization is increased by adding 26.7 g additional dimethylaminoethanol, and 4495.3 g deionized water is added to give a dispersion at 28.9 percent solids and exhibiting an acid number of 77.4 and a viscosity of 930 centipoise.

The above dispersion (240.0 g) is charged to a 2 liter reactor, diluted with 766.6 g deionized water and neutralized with 1.6 g dimethylaminoethanol. An inert gas blanket is started and the charge is heated to 80° C. A premix of 84.0 g styrene, 84.0 g butyl acrylate, 3.4 g 2,2'-azobis (2-methylbutanenitrile) and 19 g aromatic hydrocarbon solvent (BP 100° C.) is added over 10 minutes. Reaction temperature is regained and held for 2 hours to yield a product with a solids content of 19.5%, acid number of 25 and viscosity of 15 centipoise. The product contains only 18 percent epoxy, but forms a stable, small particle size dispersion when 30% of first stage polymer is copolymerized and extended with 70% of a non-functional styrene/butyl acrylate monomer mixture. This product can be cured to a flexible, impact and water resistant film. It is most useful, however, as a modifier for more brittle coatings.

EXAMPLE IX

A 12 liter reactor is charged with 1063.2 g Epon 828, 552.5 g bisphenol A, 179.1 g ethylene glycol monobutyl ether and 3.2 g tributylamine. Upgrading is carried out as before for 45 minutes to give an upgraded epoxy with a 1,2-epoxy content of 0.52 meq/g. At 150° C., a premix of 22.5 g methacrylic acid, 78.6 g of ethylene glycol monobutyl ether and 0.3 g BHT is added. After holding at 150° C. for an additional 30 minutes, the 1,2-epoxy content falls to 0.36 meq/g, which is the expected value for complete esterification of epoxy with methacrylic acid. The acrylic prepolymer of Example VIII (2505.3 g) is added, and the temperature is adjusted to 110° C.

Dimethylaminoethanol (79.2 g) is added over 3-5 minutes and the temperature is held at 110° C. for 1 hour. Additional dimethylaminoethanol (52.5 g) is added, followed by 4463.2 g deionized water to produce a dispersion at 30.4 percent solids with about 31 percent of the initial 1,2-epoxy groups copolymerizable and 69 percent of end groups ionic. The dispersion has an acid number of 87, pH of 7.4 and particle size of 0.22 microns.

The above dispersion (845.0 g) is transferred to a 2 liter reactor, diluted with 474.7 g deionized water and neutralized with 14.0 g dimethylaminoethanol. An inert gas blanket is applied and the temperature is raised to 80° C. A premix of 136.5 g styrene, 1.6 g 2, 2'-azobis (2-methylbutanenitrile) and 28.2 g mixed aromatic hydrocarbons (BP 100° C.) is added. The temperature rises to 85° C. and is maintained at 80°-85° C. for two hours. The product dispersion has a solids of 25.9 percent, acid number of 60, pH of 7.8, viscosity of 560 centipoise and particle size of 0.13 micron, and furnishes metal coatings of very good flexibility and water and product resistance.

EXAMPLE X

In this example, a minor amount of low molecular weight epoxy is defunctionalized with methacrylic acid, reacted with low molecular weight acrylic prepolymer an tertiary amine and then copolymerized in emulsion with a major portion of unsaturated monomers to produce an economical microgel containing composition suitable for the roll coating of film and foil.

A 3 liter flask with inert gas blanketing is charged with 122.5 g DER 331 (Dow Chemical) a liquid epoxy resin containing 5.35 meg/g of 1,2-epoxy functionality and having a calculated molecular weight of about 360. A premix is made of 28.7 g glacial methacrylic acid and 0.1 g BHT. When a temperature of 150° C. is reached, the premix is added, followed by 0.2 g tributylamine. After 1 hour at this temperature, the 1,2-epoxy group content falls to 1.9 meq/g. Butanol (471.7 g) is added followed by 589.9 g of Joncryl 67 (a trademarked product of Johnson Wax), an acrylic polymer of high (195) acid number and low (10,000) molecular weight. The temperature is adjusted to 110° C. and 28.4 g of dimethylaminoethanol is added over two minutes. This temperature is held for one hour; then 57.3 g additional dimethylaminoethanol is added. Deionized water (1192.2 g) is added over 30 minutes to form a copolymerizable surfactant dispersion with a solids content of 28.0 percent and an acid number of 122.

Another 3 liter flask is charged with 562.5 g of the above dispersion, diluted with 395.7 g deionized water and neutralized to a pH of 8.0 with 15.0 g of dimethylaminoethanol. An inert gas blanket is started and the temperature is raised to 80° C. Benzoin (5.18 g) is added, followed by 253.1 g methyl methacrylate and 253.1 g butyl acrylate. Hydrogen peroxide (30%, 15.5 g) is added and the reaction is held at 86°-90° C. for two hours. Five grams of 2,2-azobis (2 methylbutanenitrile) is added and the reaction is held at 85° C. for an additional hour to reach high conversion. The product is a stable, small particle size dispersion with a solids content of 43.2%, acid number of 32 and viscosity of 8000 cp. It is derived 5% by weight from methacrylate terminated epoxy, 20% from acrylic prepolymer and 75% from emulsion polymerized vinyl monomers. Despite the low level of epoxy, this composition has a very substantial microgel content, indicating that modification of the epoxy with the extender molecules is extensive.

EXAMPLE XI

A 3 liter flask with nitrogen blanketing is charged with 273.0 g of Epon 828 epoxy resin, 127.0 g bisphenol A, 44.0 g ethylene glycol monobutyl ether and 0.8 g tributylamine. Upgrading is carried out as in the previous example and the product is held at 150°-160° C. until a 1,2 epoxy content of 0.87 meg/g is reached. After cooling to 108° C., a premix of 21.5 g ethylene glycol monobutyl ether, 18.3 g t-butylaminoethyl methacrylate and 0.1 g BHT is added dropwise. The reaction is held at 120° C. until an epoxy content of 0.60 meq/g is reached; then 4.4 g ethylene glycol monohexyl ether, 13.4 g ethylene glycol monobutyl ether and 569.7 g of the acrylic prepolymer of Example I are added. The temperature is adjusted to 80° C. and a premix of 59.8 g deionized water and 29.9 g dimethylaminoethanol is added over 5 minutes. The temperature is raised to 90° C. and held for 1 hour; then 1135.7 deionized water is added to give a dispersion at 28.6% solids. The dispersion has a viscosity of 1700 cp, pH of 7.1, acid number of 93 and a particle size of 0.14 microns.

The copolymerizable surfactant dispersion prepared above (1163.6 g) is transferred to another reactor where it is diluted with 641.6 g of deionized water. Styrene (187.2 g) and benzoin (1.8 g) are added and the temperature is raised to 80° C. under a nitrogen blanket. Hydrogen peroxide (30%, 5.7 g) is added. The temperature is raised to 85° C. and held for 2 hours to complete the polymerization. The product has a solids content of 25.2, an acid number of 61.4, a particle size of 0.17 microns and a pH of 7.0. The product is only partially soluble in hot N,N-dimethylformamide, showing that copolymerization between the styrene and unsaturated amine functional epoxy has taken place.

The above dispersion is formulated into a spray finish at 18.7% solids by dilution with water and reaction solvents and viscosity adjustment with dimethylaminoethanol. This finish is entirely suitable for the spray lining of beer and beverage cans.

While a preferred embodiment of the present invention has been described, it should be understood that various changes, adaptations and modifications may be made therein without departing from the spirit of the invention and the scope of the appended claims.

What is claimed is:

1. A method of preparing a coating composition comprising
   a) reacting from about 10% to about 50% of the 1,2-epoxy groups of a 1,2-epoxy resin with an ethylenically unsaturated, epoxy-reactive monomer under conditions providing a modified epoxy resin having unsaturated sites for subsequent copolymerization;
   b) reacting the remaining 1,2-epoxy groups of the modified epoxy resin with a preformed carboxyl functional addition polymer and tertiary amine; and
   c) in an aqueous dispersion of the resulting reaction product, copolymerizing the ethylenically unsaturated groups resulting from Step (a) with an ethylenically unsaturated monomer.

2. The method of claim 1 wherein the ethylenically unsaturated monomer of Step (c) comprises at least 35% by weight of the polymer solids of the coating composition.

3. The method of claim 1 in which the amounts of modified 1,2-epoxy resin, preformed carboxyl- containing addition polymer and ethylenically unsaturated monomer are chosen such that the epoxy resin-derived portion of the resulting composition ranges from about 5% to about 50% by weight, the portion of the polymer solids derived from the preformed carboxyl functional additional polymer ranges from about 12% to about 35% by weight, and the portion of the resin solids derived from the addition polymerizable monomer comprises about 35% to about 80% by weight.

4. A coating composition prepared by a method comprising:
   (a) reacting from about 10% to about 50% of the 1,2-epoxy groups of a 1,2-epoxy resin with an ethylenically unsaturated, epoxy-reactive monomer to provide a modified epoxy resin having unsaturated sites for subsequent copolymerization;
   (b) reacting the remaining 1,2-epoxy groups of the modified epoxy resin with a preformed carboxyl-functional addition polymer and tertiary amine; and
   (c) in an aqueous dispersion of the resulting reaction product, copolymerizing the ethylenically unsaturated groups resulting from step (a) with an ethylenically unsaturated monomer.

5. The product of claim 4 wherein at least about 35% by weight of the polymer solids of the coating composition is derived from the ethylenically unsaturated monomer of step (c).

6. The coating composition of claim 4 in which the amounts by weight of modified 1,2-epoxy resin, preformed carboxyl-containing addition polymer and ethylenically unsaturated monomer are chosen such that the epoxy resin-derived portion of the resulting composition ranges from about 5% to about 50% by weight, the portion of the polymer solids derived from the preformed carboxyl functional additional polymer ranges from about 12% to about 35% by weight, and the portion of the resin solids derived from the addition polymerizable monomer comprises about 35% to about 85% by weight.

7. The coating composition of claim 4 including a free addition polymer formed associatively with the copolymerization of step (c).

8. The coating composition of claim 4 wherein the unsaturated, epoxy-reactive monomer of step (a) is a carboxyl-functional or amine-functional monomer.

9. The coating composition of claim 8 wherein the unsaturated, epoxy-reactive monomer is acrylic acid or methacrylic acid.

10. The coating composition of claim 8 wherein the unsaturated, epoxy-reactive monomer is a secondary or tertiary amine.

11. The coating composition of claim 8 wherein the unsaturated, epoxy-reactive monomer is an amino (meth)acrylate.

12. The coating composition of claim 4 wherein the ethylenically unsaturated monomer of step (c) comprises styrene.

* * * * *